United States Patent [19]

Grube et al.

[11] Patent Number: 4,598,812
[45] Date of Patent: Jul. 8, 1986

[54] CONVEYER FOR SUSPENDED ARTICLES, E.G. GARMENTS

[75] Inventors: Erwin Grube, Bielefeld; Walter Kuhlmann, Lage, both of Fed. Rep. of Germany

[73] Assignee: Durkoppwerke GmbH, Bielefeld, Fed. Rep. of Germany

[21] Appl. No.: 610,243

[22] Filed: May 14, 1984

[30] Foreign Application Priority Data

May 13, 1983 [DE] Fed. Rep. of Germany ....... 3317403

[51] Int. Cl.$^4$ ............................................. B65G 17/00
[52] U.S. Cl. ................................. 198/343; 198/465.4; 104/89
[58] Field of Search ............... 198/473, 678, 683, 684, 198/685, 343, 648, 680, 465.4, 465.1, 803.01; 104/250, 137, 106, 110, 89

[56] References Cited

U.S. PATENT DOCUMENTS

| | | | |
|---|---|---|---|
| 2,899,072 | 8/1959 | Weiss | 198/678 |
| 3,338,420 | 8/1967 | McClenny et al. | |
| 3,753,487 | 8/1973 | Miburn-Bathgate | 198/683 |
| 3,902,587 | 9/1975 | Checcucci | 198/472 |
| 4,169,529 | 10/1979 | Hunter | 198/648 |

FOREIGN PATENT DOCUMENTS

| | | |
|---|---|---|
| 1935431 | 4/1970 | Fed. Rep. of Germany . |
| 1933036 | 1/1971 | Fed. Rep. of Germany . |
| 2310356 | 9/1973 | Fed. Rep. of Germany . |
| 2448184 | 4/1975 | Fed. Rep. of Germany . |
| 2405030 | 8/1975 | Fed. Rep. of Germany . |
| 166046 | 3/1934 | Switzerland . |
| 599014 | 5/1978 | Switzerland ........................ 198/473 |

*Primary Examiner*—Joseph E. Valenza
*Assistant Examiner*—Kyle E. Shane
*Attorney, Agent, or Firm*—Karl F. Ross; Herbert Dubno

[57] ABSTRACT

A conveyer for hanging garments or the like in which the carriage for the articles to be suspended as rollers riding on an on-edge endless band formed along its upper edge with a continuous bead and suspended from a track in which an endless chain supporting the band is continuously driven. An abutment can be selectively introduced into the path of the carriage to temporarily immobilize it and allow loading of articles onto or unloading of articles from the carriage.

10 Claims, 2 Drawing Figures

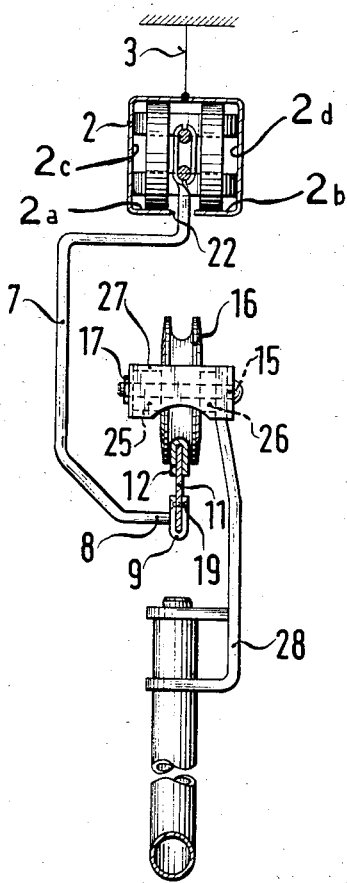

CONVEYER FOR SUSPENDED ARTICLES, E.G. GARMENTS

FIELD OF THE INVENTION

Our present invention relates to a conveyer for suspended articles, e.g. garments on hangers, and, more particularly, to a conveyer which can tolerate the temporary immobilization of the suspended article while the conveyer continues to run.

BACKGROUND OF THE INVENTION

It is known to provide conveyers for suspended articles which can allow for temporary immobilization of a suspended article, e.g. for cleaning establishments and in like facilities where the articles are garments on hangers and the immobilization of the article and/or a hanger carrier, will allow an article to be mounted upon the conveyer, generally at a selected location, or a garment or other article to be removed from the conveyer.

The conveyer itself may have a variety of path shapes, all of which are endless, and in some of the prior art systems, while the drive motor was operated continuously, the entire conveyer system apart from the drive had to be stopped and restarted for each emplacement or removal of an article.

In German open application No. DE-OS 19 33 036, a conveyer for suspended articles was described in which the element upon which the hangers were placed included a light-weight band disposed on edge and suspended, in turn from a track via rollers. In this system, however, the temporary immobilization of an article on the conveyer was not permitted or was not convenient. In the system of U.S. Pat. No. 3,338,420, the endless band, also disposed on edge, was provided with a friction drive. This band had a multiplicity of oval holes in which the hangers for the garments could be engaged. In systems in which a carrier for articles could be immobilized with continuous movement of the conveyer, far more complex arrangements were employed which were not compatible with suspended article conveyers.

In these latter systems, trolleys of the so-called "power and free" type were provided in which the carrier was suspended on a track and could be selectively engaged by or disengaged from a chain or other continuously displaced element. The problems with such systems devolved from the complexity of the coupling required between the continuously displaced endless element and the trolley or carriage on its track or guide.

OBJECTS OF THE INVENTION

It is the principal object of the present invention to provide a suspended article conveyer in which the article can be immobilized selectively, but yet which is of a simpler construction than the conveyers described above or those known heretofore.

Another object of this invention is to provide a conveyer in which the aforedescribed disadvantages are obviated, and which enables continuous operation of the conveyer with minimum complexity while nevertheless permitting temporary immobilization of an article carrier thereof.

It is also an object of this invention to provide a particularly low cost, easily maintained and easily controlled conveyer for the purposes described.

SUMMARY OF THE INVENTION

These objects and others which will become apparent hereinafter are attained, in accordance with the present invention, in a conveyer which comprises an endless band disposed on edge and flexible in the horizontal direction but comparatively stiff in the vertical direction, a profile strip or bead, e.g. of channel configuration, fixed over the upper edge of this steel band, a track disposed above the band and along which rollers are guided, suspenders connecting these rollers to the band and a carriage suspended from the band and provided with at least one roller guided on the channel or bead and adapted to receive a hanger or other article which is suspended from the carriage.

According to the invention, moreover, means is provided along the path of the band for selectively engaging the carriage to temporarily immobilize the latter while the band continues to run past the immobilized carriage, thereby enabling the loading or unloading of the carriage at the site of the latter means.

According to a feature of the invention, the track is provided with a chain along which the band-carrying rollers are spaced and from which hangers extend downwardly to support the upstanding band at this lower edge. Advantageously these hangers extend downwardly through a slit in the channel-shaped track which has a pair of vertical flanks and a pair of horizontal running surfaces on opposite sides of this slit. Horizontal rollers engage the vertical flanks whereas vertical rollers ride on the running surfaces.

Each of the suspenders, moreover, can engage a bracket which reaches around the underside of the on-edge band and engages the lower edge thereof. Rivets or the like can be utilized to transfix the band and connect it to the respective brackets.

The means for immobilizing the carriage can be a mechanically actuated element or an element actuated by remotely controlled means, e.g. an electromechanically or pneumatically or hydraulically actuated abutment which can extend into the path of the carriage. Preferably the carriage comprises a pair of carriage rollers riding on the band and a U-shaped member having a horizontal bight portion over which the hangers are engaged.

BRIEF DESCRIPTION OF THE DRAWING

The above and other objects, features and advantages of the present invention will become more readily apparent from the following description, reference being made to the accompanying drawing in which:

FIG. 2 is a cross-sectional view taken along the line II—II of FIG. 1.

SPECIFIC DESCRIPTION

Figure 1:
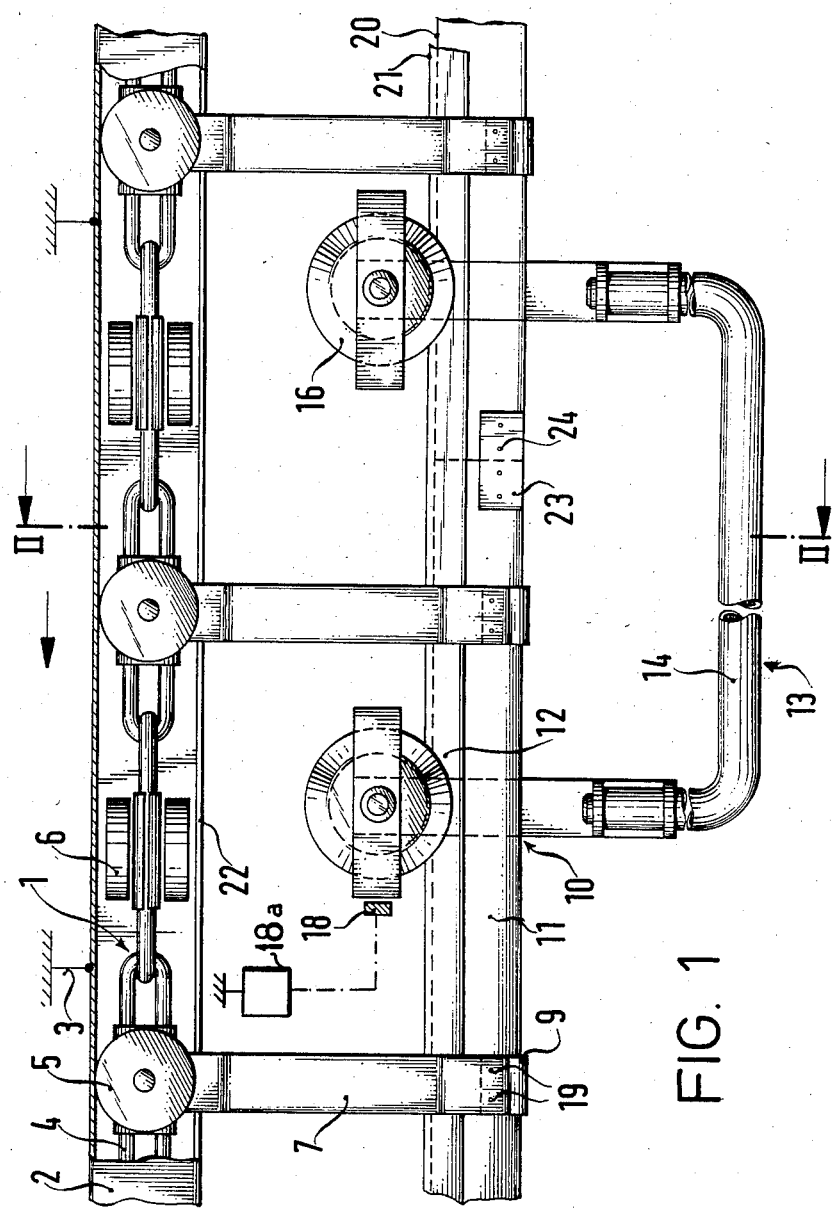
FIG. 1 is a partial section of a conveyer in a side-elevational view according to the invention.

The conveyer shown in FIGS. 1 and 2 comprises a conveyer chain 1 disposed within a channel or track 2 which is supported at spaced apart locations as represented at 3 from some fixed structure or frame. The elements 3 can collectively be considered the support for the conveyer.

The chain 1 is driven by a motor through a transmission and sprocket wheel, not shown, as is usually the case and is continuously driven. It comprises links 4 which are interconnected and which themselves carry support rollers 5 riding upon the running or support surfaces 2a and 2b of the track 2 and spacing rollers or guide rollers 6 which can engage the vertical flanks 2c and 2d of the track.

Flat generally C-shaped metal suspender bars 7 are carried by the chain 1 at each pair of rollers 5 and extend downwardly through a slit 22 in the track and have inwardly extending ends 8 which are provided with upwardly open channel-shaped brackets 9 between the jaws of which a band 11 is received so that this band is held in its on-edge or upright orientation shown. The band 11 is anchored in the slit formed between the jaws of each bracket 9 by rivets or other means 19 transfixing each bracket and the band. The band 11 is flexible in the horizontal plane in which this band travels and is stiff in the vertical direction.

The butted ends of the band, to form the endless band, are held together by a further bracket 23 and rivets 24 or other means transfixing this U-section bracket and the both abutting ends of the band.

The upper edge 20 of the band is provided with a reinforcing bead in the form of a commercial U-section or channel-shaped profiled bar 12 which has the same length as the band and has it abutting ends welded together or affixed in abutting relationship by rivets or the like transfixing the band and this channel or otherwise secured to the band. Preferably the abutting ends of this channel are offset in location from the abutting ends of the band. The bead or channel 12 is preferably formed by a wear-resistant flexible synthetic resin such that it can be removed from the band 11 only with considerable force.

The bead-reinforced band 11, therefore, while being extremely stiff in the vertical direction, can be as flexible in the horizontal direction as required for the configuration of the path along which this band is disposed.

A carriage 13 rolls along the bead 12 as can be seen from FIGS. 1 and 2 and comprises a U-shaped member or stirrup 14 whose horizontal bight carries the hooks of the hangers and whose upstanding ends are provided with shanks 28 of bent bar stock which are each anchored to a respective closed frame 27.

The frame 27 and the respective shank 28 are provided with two registering bores which are traversed by a journal pin 15 anchored against displacement in these bores and by a commercially available element such as a cotter pin or C-clip 17 against undesired withdrawal.

Each pin 15 carries a roller 16 and two spacer sleeves 25 and 26, the latter centering the roller 16 in the frame.

Each roller 16 is formed with a generally wedge-shaped profile groove along its periphery and in which the bead 12 is embraced. The roller 16, after the carriage has been set upon the band 11, therefore, rides upon the edge 21 of the bead.

Preferably above this edge 21, a selectively actuatable abutment 18 is provided, the latter being coupled to a power unit 18a on the support 3 which can be a lever drive or the like and which can introduce the abutment 18, via an electromagnet or pneumatic or hydraulic cylinder into the path of a carriage 13.

When the chain 1 is driven, the carriages 13 are entrained therewith and usually once in motion, the carriages move at the same rate on the chain and there is no rotation of the rollers 16. The normal inertia and internal friction ensure that the carriages will move with the band 11. When required, the abutment can be interposed in the path of a carriage 13 while the band 11 continues to move, thereby causing the roller 16 to rotate but immobilizing carriage so that it and any other carriages which encounter it are temporarily immobilized for the loading of articles on the carriage or the removal of articles therefrom. When the abutment 18 is retracted, the carriages are again permitted to be entrained by the band 11.

We claim:

1. A suspended-article conveyer, comprising:
   a horizontally flexible and vertically stiff continuous endless band disposed on edge so that the width of the band is vertical, and provided along its upper edge with a continuous bead
   means for suspending and displacing said band continuously along a closed path;
   at least one carriage for articles to be carried by and suspended from said band, said carriage comprising a roller riding on said bead; and
   an abutment selectively interposable in the path of said carriage for temporarily immobilizing said carriage while the band continues to move past said abutment.

2. The conveyer defined in claim 1, further comprising a track disposed above the said path, an endless chain displaceable along said track and hangers spaced along said chain for suspending said band from said chain.

3. The conveyor defined in claim 2 wherein said track has a downwardly open channel formed with a pair of supporting surfaces flanking a slit and a pair of vertical surfaces, said chain being provided at spaced locations with support rollers riding on said supporting surfaces and guide rollers engaging said vertical surfaces, said hangers reaching downwardly through said slit.

4. The conveyer defined in claim 3 wherein each of said hangers is connected to said chain at a respective pair of support rollers.

5. The conveyer defined in claim 4 wherein each of said hangers has a upwardly open channel receiving and engaging a lower edge of said band.

6. The conveyer defined in claim 5, further comprising means transfixing each of said upwardly open channels and said band for securing said upwardly open channels to said band.

7. The conveyer defined in claim 6 wherein said bead is composed of a wear-resistant synthetic resin.

8. The conveyer defined in claim 7 wherein the roller of said carriage is provided with a peripheral groove snugly receiving said bead.

9. The conveyer defined in claim 8 wherein said carriage is formed with a stirrup having a horizontal bight adapted to receive hooks of garment hangers forming said articles, said stirrup having shanks at opposite ends thereof, respective frames connected to said shanks, and a respective carriage roller received in each of said frames and riding on said bead.

10. The conveyer defined in claim 9, further comprising remotely actuatable means for displacing said abutment.

* * * * *